Feb. 11, 1958  D. G. ROWE, JR  2,822,576
CURING TUBE
Filed March 31, 1955
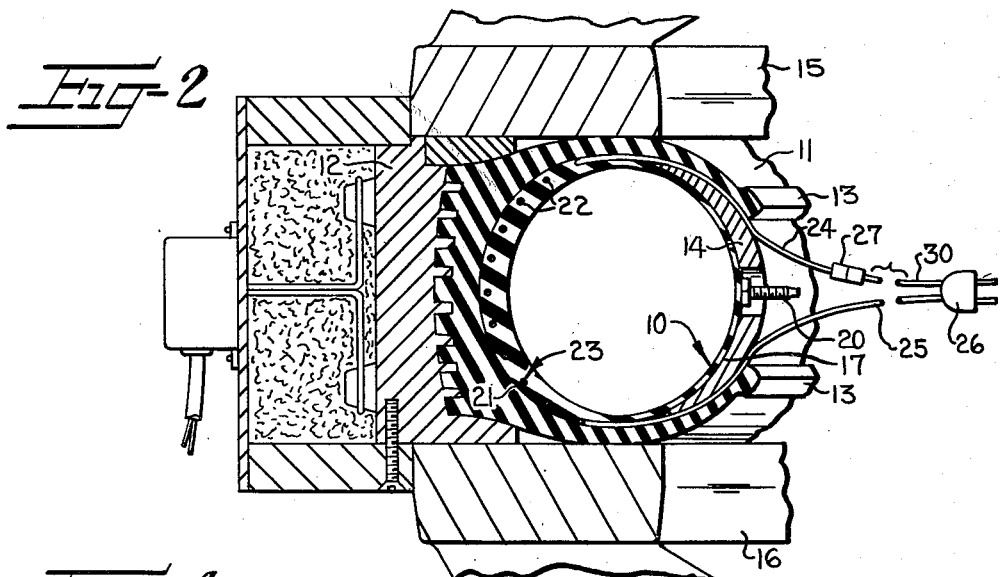
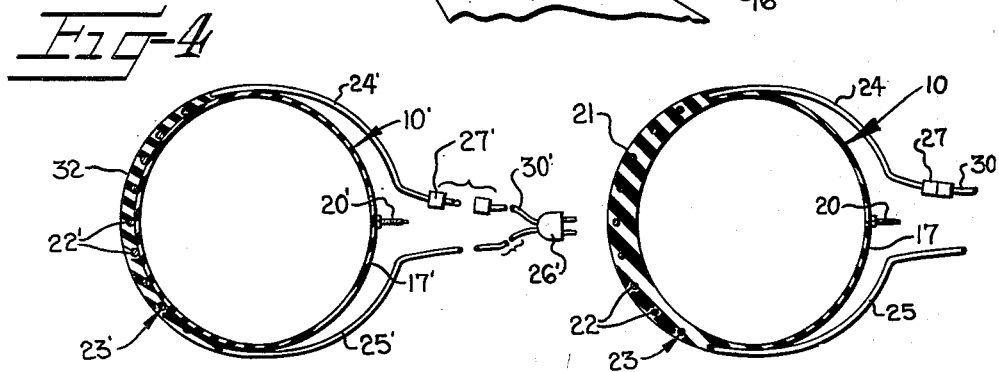
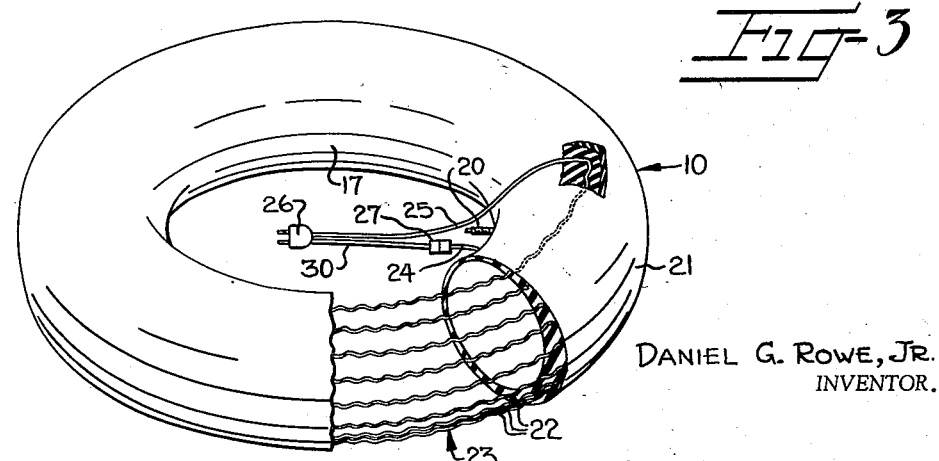
DANIEL G. ROWE, JR.
INVENTOR.
BY Eaton + Bell
ATTORNEYS

United States Patent Office 2,822,576
Patented Feb. 11, 1958

2,822,576

CURING TUBE

Daniel G. Rowe, Jr., Hickory, N. C.

Application March 31, 1955, Serial No. 498,302

1 Claim. (Cl. 18—18)

This invention generally relates to the art of recapping pneumatic tire casings and, more especially, to an improved curing tube adapted to be positioned within a tire casing during the vulcanizing process. It has been customary heretofore, to apply a tread strip to the periphery of a tire casing and to then place the tire casing with the tread strip thereon in a mold or matrix of the type heated either electrically or by steam. However, the curing time has been relatively high because it has been necessary for the heated mold or matrix to thoroughly heat the tire casing from the outside surface thereof inwardly during the course of the recapping process.

In order to reduce the time required to complete a curing operation, it is an object of this invention to provide an improved curing tube whose outer peripheral portion has a plurality of encircling electrical heating element portions molded therein with opposite ends of the heating element being so arranged as to extend past the usual curing rims and being connected to a suitable socket for connecting the heating element to a source of electrical energy. It is contemplated that the rubber surrounding the various convolutions or sections of the heating element may be an original part of the curing tube as originally molded or the rubber surrounding the various convolutions of the heating element may be vulcanized to the curing tube. Thus, the heat required for vulcanizing is supplied to the tire casing from both the inside and outside thereof simultaneously.

It is another object of this invention to provide a curing tube of the character described wherein the convolutions of the heating element are irregularly formed throughout their lengths or are corrugated to permit expansion and contraction of the rubber surrounding the same as the curing tube is inflated and deflated, respectively.

Some of the objects of the invention having been stated, other objects will appear as the description proceeds when taken in connection with the accompanying drawings, in which—

Figure 1 is a perspective view of one form of the improved curing tube with a portion thereof broken away to show parallel portions of the corrugated or irregularly formed convolutions of the wire heating element;

Figure 2 is a fragmentary radial section through the improved curing tube showing the same in association with a vulcanizing apparatus including a matrix or mold and curing rim with a portion of a tire casing positioned in the matrix, and the curing tube and curing rim positioned within the casing;

Figure 3 is a sectional view of the curing tube similar to that shown in Figure 2, but wherein the curing tube is removed from the tire casing;

Figure 4 is a view similar to Figure 3, but showing a somewhat modified form of the invention wherein a strip of rubber, molded around the convolutions of the electrical heating element, is vulcanized to the outer peripheral surface of the curing tube.

Referring more specifically to the drawings, the first form of improved curing tube is broadly designated at 10 and is shown in Figure 2 within a tire casing 11 positioned in a conventional mold or matrix 12. The opening defined between the beads 13 of the tire casing 11 is closed during the curing process by a suitable curing rim 14 and the upper and lower ends of the mold or matrix 12 are engaged by upper and lower clamping members 15, 16. The matrix 12 and clamping members 15 and 16 are shown as being substantially of the type disclosed in a patent to Napier, No. 2,475,579 dated July 5, 1949, although it is to be distinctly understood that the improved curing tube may be used with many different types of tire recapping machines.

The curing tube 10 is constructed in a manner similar to conventional curing tubes in that the annular tubular body 17 thereof has the usual valve 20 projecting from the inner peripheral surface thereof for admitting and exhausting air from the curing tube 10. The outer peripheral portion of the body 17 of the curing tube 10 preferably has a thickened portion 21 thereon which extends through a substantially semi-circular arc transversely of the tube 10 and in which a plurality of closely spaced substantially parallel convolutions 22 of a wire heating element 23 are embedded. These convolutions 22 of the heating element 23 extend entirely around the outer peripheral portion of the curing tube 10 and opposite end portions of the heating element, which opposite end portions are indicated at 24, 25, are preferably suitably insulated, as by being encased in rubber, neoprene or the like.

It will be observed in Figures 1, 2 and 3 that the opposite end portions 24, 25 extend substantially radially inwardly relative to the axis of the tube 10 and astride substantially diametrically opposed points in the cross-sectional area of the body 17 of the tube 10 so as to clear the curing rim 14 as shown in Figure 2. In order to facilitate placing the curing rim 14 in the tire casing 11 after the curing tube 10 has been placed within the tire casing 11, one of the end portions of the heating element 23, which is the portion 25 in this instance, is connected to one side of a suitable plug 26 adapted to be plugged into a suitable source of electrical current, not shown, and the other end portion 24 of the heating element 23 is removable connected by a suitable quick-disconnecting and connecting unit 27 to one end of a conductor 30. The other end of the conductor 30 is connected to the side of the plug 26 opposite from the side to which free end portion 25 of the heating element 23 is connected.

It is thus seen that, when the tube 10 is placed within the tire casing 11 and the quick-disconnect means 27 is utilized to connect the wire 30 to the end portion 24 of the corrugated or irregularly formed convolutions 22 of the heating element 23, the heating element 23 will heat the surrounding rubber 21 which will, in turn, heat the interior of the casing 11. Of course, it is to be distinctly understood that the electrical resistance of the heating element 23 should be such that it will not heat the curing tube 10 to such an extent as to melt the rubber in the curing tube 10. This indicates, of course, that the exterior of the casing 11 is heated to a substantially greater extent than is the interior thereof during the vulcanizing process.

In the modified form of the invention shown in Figure 4, the curing tube is broadly designated at 10' and is constructed generally in the same manner as the curing tube 10 with the exception that the irregularly formed convolutions 22' of the heating element 23' are embedded or molded in a rubber strip 32 which is, in turn, vulcanized to the outer peripheral portion of the tube 10', the tube 10' otherwise being of conventional construction. It will be noted that the strip of rubber 32 also preferably extends through a substantially semi-circular arc and the opposed end portions 24′, 25′ of the heating element 23′ extend outwardly from beneath opposite or substantially diametrically opposed edges of the rubber strip 32 so that these end portions 24′, 25′ may also extend past the curing rim in the same manner as that described with respect to the end portions 24, 25 of the heating unit or element 23.

A suitable quick-disconnect and connecting unit 27′ is also provided on the end portion 24′ of the heating element 23′ for connecting the same to a wire or conductor 30′ and corresponding ends of the wire or conductor 30′ and the end portion 25′ of the heating element 23′ are connected to opposite sides of a plug 26′ also adapted to be connected to a suitable source of electrical current, not shown.

It is apparent that the curing tube construction shown in Figure 4 may be used in the manner described with respect to the curing tube 10 for heating the interior of the casing 11 and, thus, the use of either form of curing tube will greatly reduce the amount of time required in the vulcanizing of a tire casing, since the tire casing is heated from within by the corresponding electrically heated curing tube at the same time that it is heated from without by the matrix 12.

In the drawings and specification there has been set forth a preferred embodiment of the invention, and although specific terms are employed, they are used in a generic and descriptive sense only and not for purposes of limitation, the scope of the invention being defined in the claim.

I claim:

In an apparatus for retreading tire casings having a tread forming matrix and means for heating the matrix to apply heat to a tire casing positioned within said apparatus, said apparatus also including an annular curing tube adapted to be positioned within the tire casing and an annular curing rim for confining the curing tube within the tire casing, the combination of a heating element carried by the curing tube, said heating element having conductor lines extending inwardly therefrom and overlying opposite edge portions of said curing rim to straddle the same, an electrical plug connecting said conductor lines together, and a quick-connect-disconnect element interposed in a medial portion of one of said conductor lines whereby said one conductor line of the heating element may be disconnected to facilitate positioning the curing rim about the curing tube.

References Cited in the file of this patent

UNITED STATES PATENTS

| 1,339,736 | Burke | May 11, 1920 |
| 1,923,736 | Lewis | Aug. 22, 1933 |
| 1,984,909 | Woock | Dec. 18, 1934 |
| 2,451,992 | Grotenhuis | Oct. 19, 1948 |
| 2,475,579 | Napier | July 5, 1949 |

FOREIGN PATENTS

| 572,979 | Germany | Mar. 24, 1933 |